United States Patent [19]
Williamson

[11] Patent Number: 5,358,168
[45] Date of Patent: Oct. 25, 1994

[54] BRAZED HYDRAULIC FITTINGS AND METHOD OF MAKING SAME

[75] Inventor: Nigel D. L. Williamson, Fort Wayne, Ind.

[73] Assignee: NWD International, Inc., Ann Arbor, Mich.

[21] Appl. No.: 193,902

[22] Filed: Feb. 9, 1994

Related U.S. Application Data

[63] Continuation of Ser. No. 915,007, Jul. 16, 1992, abandoned.

[51] Int. Cl.$^5$ .................. F16L 13/08; B23K 101/04; B23K 31/02
[52] U.S. Cl. ................... 228/132; 228/168; 228/174; 228/253; 285/287
[58] Field of Search ............... 228/132, 165, 168, 174, 228/253, 255; 285/287

[56] References Cited

U.S. PATENT DOCUMENTS

| | | | |
|---|---|---|---|
| 1,801,171 | 4/1931 | Mueller et al. | 285/287 |
| 3,260,539 | 7/1966 | Herron | 285/287 |
| 3,372,476 | 3/1968 | Peiffer | 228/253 |
| 3,427,707 | 2/1969 | Nowosadko | 285/287 |

FOREIGN PATENT DOCUMENTS 0718264  11/1954  United Kingdom ............... 285/287

*Primary Examiner*—P. Austin Bradley
*Assistant Examiner*—Jeffrey T. Knapp
*Attorney, Agent, or Firm*—Baker & Daniels

[57] ABSTRACT

The present invention is a brazed fitting suitable for use as a hydraulic coupling for pressurized fluids. A male component has a tapered surface which mates and creates an interface with a similarly tapered surface of a female component. A brazing material is heated to diffuse and alloy within the interface, forming a connection between the surface portions which is stronger than the metal being connected. A groove on the male component retains the brazing material in the middle of the surface portions so that after the components are joined in an interference fit, the assembly is heated and the brazing material melts in the middle of the interface and connects together the mating surfaces by diffusing and alloying. The counterbore of the female component does not require a base, and the resulting structure has improved fluid flow characteristics.

14 Claims, 2 Drawing Sheets

BRAZED HYDRAULIC FITTINGS AND METHOD OF MAKING SAME

This is a continuation of application Ser. No. 07/915,007, filed Jul. 16, 1992, now abandoned.

BACKGROUND OF THE INVENTION

1. Field of the Invention

The present invention relates generally to hydraulic or pneumatic fittings. More specifically, the field of the invention is that of brazed fittings for forming hydraulic couplings.

2. Description of the Related Art

Hydraulic fittings are conventionally of brazed construction, particularly those fittings having a specially shaped design. Conventional brazed fittings are manufactured by a press fit methodology, whereby the typically steel components are bored or counterbored to a precise diameter. There is usually a lead-in taper of 45° at the outer end of the conduit which has counterbore aiding in locating the mating port. The conduit end includes a spigot which enters the counterbore with an interference fit of between 0.0005 inches and 0.005 inches, requiring that each part be made to a maximum tolerance of ±0.001125 inches. A brazing material, for example a pure copper or copper compound formed in a ring, is located between the bottom of the spigot and the base of the counterbore. During the heating, the brazing material melts and is drawn up the interference fit by capillary attraction. The brazing material diffuses and alloys with the metal of the components so that the interface between the spigot and the counterbore is stronger than material of the components. Ideally, the resulting integral fitting produces a high degree of integrity and reliably performs its intended function, while minimizing production costs.

An alternative to brazed fittings involves forming fittings with multiple connection portions adapted for coupling with various sized tubes. However, the formation of the multiple connections requires additional material, as well as additional manufacturing time, which is duplicative and wasteful. Further, each connection portion provides another possible leak path for the pressurized medium within the fitting. Therefore, brazed fittings are preferable because they are generally less expensive to manufacture, have greater structural security, and have fewer potential leak paths.

However, on the rare occasions when a brazen fitting fails, the failure is typically catastrophic. For example, the intruding component of the brazed fitting may break loose from its mating part, usually while containing fluids under high pressure, resulting in a rapid deterioration of the hydraulic system. This is usually the result of the brazed fitting being poorly formed, typically due to insufficient "wetting" of the mating surfaces which are brazed together. The insufficient "wetting" may be due to misalignment or imprecise manufacture of the components which are press fit together. Poorly formed brazed fittings may leak in service, and also may have a improperly aligned mating components, both of which may contribute to a catastrophic failure.

One particular problem with such fittings involves the intruding part being subject to misalignment during assembly. For example, the lead-in of the intruding conduit end may not be evenly aligned with the corresponding lead-in chamfer of the port which allows the conduit end to cant over prior to the application of assembly force. When assembly force is applied, the conduit end is driven down the chamfer and alternating high and low portions of the interference fit are created. These high and low portions of the interference fit are areas of potential porosity and of weakness under pressurized loads.

Also, a common side effect of conventional brazing is the formation of a sharp-edged skin at the visible joint line between the assembled conduit end and the port. This is caused by the port gouging some material from the surface of the conduit end as it is press fit during assembly, and the gouged material is an unsightly blemish. Further, the seal between the brazed surfaces may become porous and have substantially reduced strength similar to misaligned components.

Another potential problem with conventional brazing techniques, although much rarer than the aforementioned problems, is that penetration of the brazing material into the interface between the mating surfaces may be insufficient to form a reliable brazed connection. The brazing connection depends on the mating surfaces being closely positioned, and on the brazing material being in contact with the mating surfaces when in the liquid state. If the mating surfaces are not properly formed, or the brazing material is not in contact with both of the mating surfaces, the liquid brazing material tends to flow away from the mating surfaces—being drawn by its own surface tension into a rounded mass of liquid away from the interface of the mating surfaces. After the rounded mass cools, it forms a solid mass which does not aid in bonding together the mating surfaces, and which also may go undetected until failure of the coupling.

What is needed is an improved method of brazing together components of hydraulic fittings.

A further need exists for a brazing method which aligns the components more precisely.

Another need exists for a brazing method which avoids gouging the components during manufacture.

Also needed is a brazing method which ensures penetration of the brazing material into the interface of mating surfaces.

SUMMARY OF THE INVENTION

The present invention involves a method of brazing together components of hydraulic fittings which has greater reliability and accuracy than the aforementioned prior art methods. The mating surfaces are disposed at only a slight angle from the center axis of the hydraulic passage formed in the fitting, which facilitates alignment of the mating surfaces and inhibits gouging as the components are pressed together. Also, a small groove in one of the mating surfaces holds the brazing compound, so that the brazing material is automatically located in the middle of the interface.

One advantage of the present invention is that the fitting components may be manufactured more easily. The counterbored female ports are machined with a slight outward taper, and the spigots of the mating male conduit end are machined with a complimentary angle. The relatively slight taper of the mating surfaces allows for greater manufacturing tolerances, for example about ±0.003 inches, which lowers the difficulty and expense of manufacturing the components of the fitting. Further, the slight tapers are self-aligning in a relatively tight interference fit and do not tend to gouge when pressed together so that the components may be readily and reliably assembled. Misalignment of the components is also minimized by utilizing a slight taper on the mating surfaces.

Another advantage is obtained by locating the brazing material in a groove in one of the mating surfaces. This locates the brazing material at the site of the brazing and the interference fit between the mating surfaces prevents the liquid brazing material from escaping the interface. Rather, the material diffuses within the metal and forms a region of alloy which is stronger than the pure metal itself. Both peel testing and shock loading testing on fittings made according to the present invention have shown that the pure metal breaks before the alloy portion at the brazing site.

The internal flow characteristics are improved for a hydraulic coupling formed according to the invention. The port may be machined without a base as a tapered cross hole so that the fluid flow is not disturbed by turbulence normally caused by the base of the port. The base is no longer required because the brazing material is located in the groove on the spigot. Further, the internal bore of the spigot may include an internal taper to provide a more laminar flow through the path defined by the receiving taper of the port and the spigot of the conduit end.

Other advantages are also derived from the present invention. For example, unsightly material from one component gouging another is minimized or eliminated. The assembly of the components is much more accurate, making the fittings easier to be used in manufacturing plants. Also, the resulting hydraulic couplings may withstand far greater pressures than those with the prior art brazed fittings, with porosity at the interface being virtually eliminated.

The present invention, in one form thereof, is a brazed fitting comprising two components and a brazing material. The first component includes a bore and a mating surface portion. The second component includes a counterbore in fluid communication with a mating surface portion having a shape corresponding to the shape of the first mating surface portion, with an interface being formed between the mating surface portions. The brazing material is diffused and alloyed in the interface between the mating surface portions. One of the mating surface portions includes a groove which is used in the brazing process. The brazing material is diffused and alloyed by first locating the brazing material within the groove, then assembling the mating surface portions in abutting relation, and heating the assembly to melt the brazing material so that the liquid brazing material penetrates the interface between the mating surface portions.

The present invention, in another form thereof, is a brazed fitting comprising two components and a brazing material. The first component includes a bore and a mating surface portion. The second component includes a counterbore in fluid communication with a mating surface portion having a shape corresponding to the shape of the first mating surface portion, with an interface being formed between the mating surfaces. The brazing material is diffused and alloyed in the interface between the mating surface portions. The mating surface portions are tapered to improve the connection and assembly of the fitting. The brazing material is diffused and alloyed by the process of first assembling the mating surface portions in abutting relation, locating the brazing material adjacent the interface, and heating the assembly to melt the brazing material so that the liquid brazing material penetrates the interface between the mating surface portions.

One object of the present invention is to provide an improved method of brazing together components of hydraulic fittings.

A further object is to provide a brazing method which aligns the components more precisely.

Another object is to provide a brazing method which avoids gouging the components during manufacture.

Also an object is to provide a brazing method which ensures penetration of the brazing material into the interface of mating surfaces.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
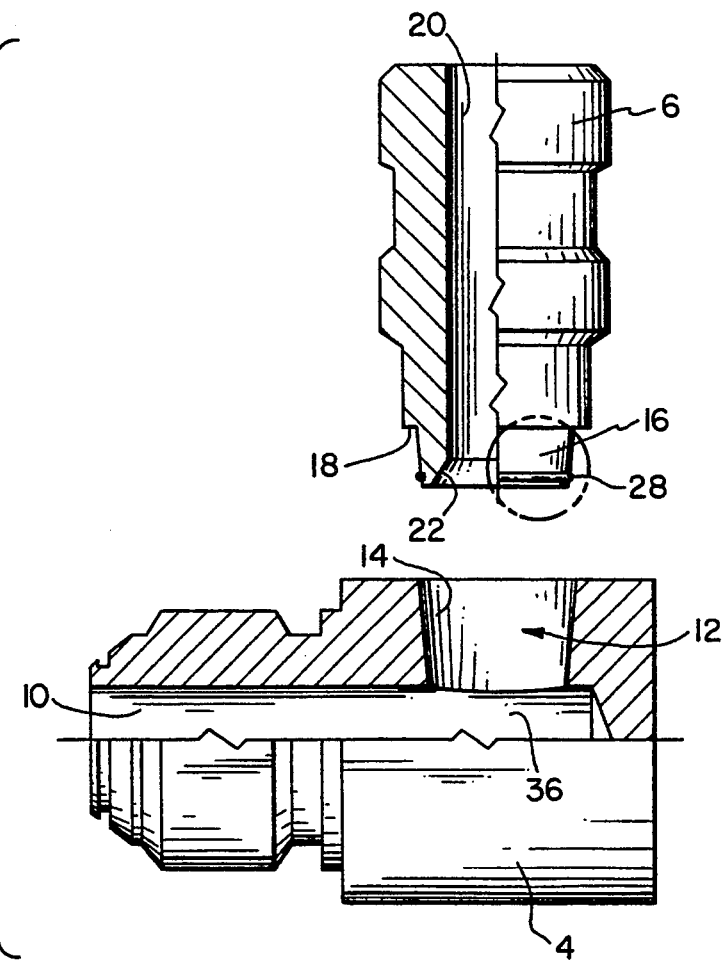
FIG. 1 is an exploded side view, in partial cross-section, of the fitting components before brazing.
Figure 3:
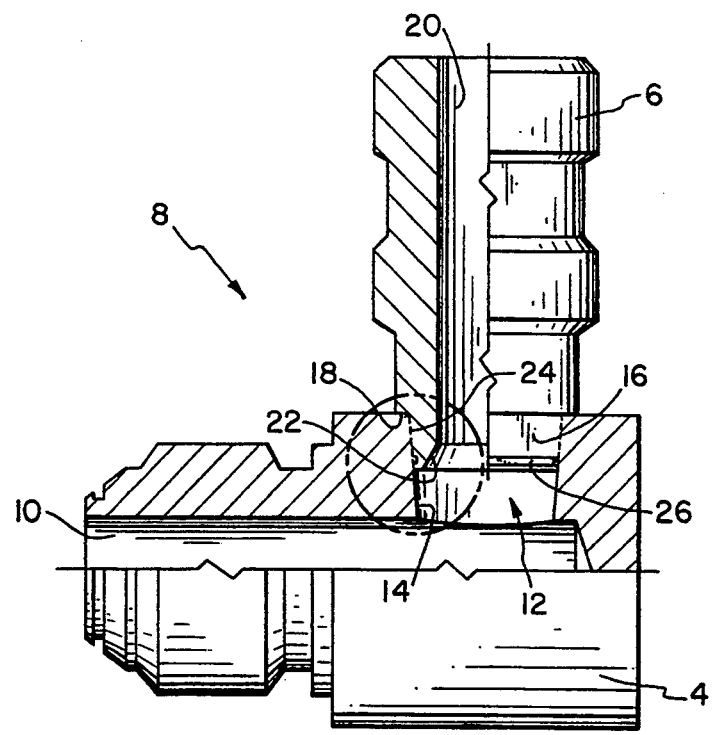
FIG. 3 is a side view, in partial cross-section, of the brazed hydraulic fitting.

The present invention is a fitting formed by brazing which is adapted to serve as a hydraulic coupling for a pressurized fluid. FIG. 1 shows the two components, namely port body 4 and conduit end 6, which are brazed together to form brazed fitting 8 shown in FIG. 3. Port body 4 includes internal fluid passageway 10 in fluid communication with port opening or counterbore 12 defined by port surface portion 14. Conduit end or spud 6 includes spigot 16 which has a surface portion which is shaped to match the contour of port surface portion 14, with spigot 16 extending from shoulder 18. Bore 20 extends through the axial center of conduit end 6, with bore 20 including radially outwardly extending tapered surface 22 within spigot 16. As shown in FIG. 3, port surface portion 14 and spigot 16 abut to form interface 24 between their outer surfaces.

In accordance with the present invention, port surface portion 14 and spigot 16 are tapered. Interface 24 has a relatively high unit loading up which a brazing material flows by capillary attraction during the brazing process. The tapered fit of port surface portion 14 and spigot 16 help to align interface 24, and shoulder 18 further facilitate the alignment of conduit end 6 in port body 4. The taper angle, relative to the central axis of conduit end 6, is slight, for example equal to or less than about 10°, and preferably about 5°. This allows port surface portion 14 and spigot 16 to be produced within greater tolerances than conventional surfaces prepared for brazing.

Figure 2:
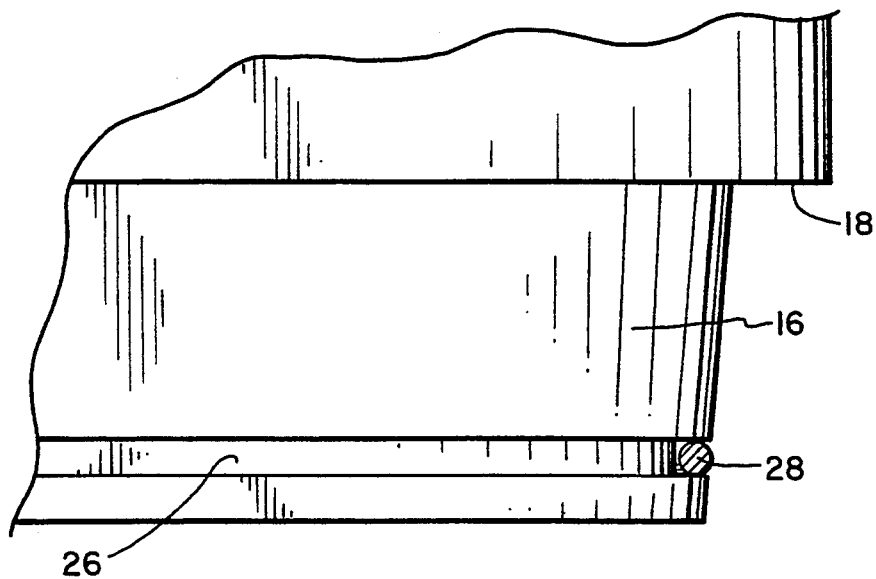
FIG. 2 is an enlarged view, in partial cross-section, of the highlighted portion of FIG. 1 showing the male fitting component.

In accordance with another aspect of the invention, conduit end 6 includes groove 26 which is used to retain brazing material 28 before the insertion of spigot 16 into port surface portion 14 (FIG. 2). While conventional brazing involves depositing the brazing material at one end of the interface of surfaces to be brazed together, groove 26 advantageously locates brazing material 28 in the middle of interface 24. This location prevents any pooling away of any melted brazing material from interface 24, because groove 26 remains in communication with interface 24 unless conduit end 6 is detached from port body 4. Groove 26 is preferably located in spigot 16 at the end proximate to port surface portion 14, although a groove for retaining brazing material may be located in either the port surface portion or the spigot.

Fitting 8 is manufactured from two components to be connected together. The two components, for example port body 4 and conduit end 6, have their mating surfaces formed with a slight taper. The manufacture continues by depositing brazing material within a groove of one of the components, for example groove 26 of spigot 16. Next with this example, spigot 16 is positioned to intrude into port opening 12 and pressed to form an assembly by interference fit with port surface portion 14. The assembled components are heated to a brazing temperature so that the brazing material is drawn into interface 24 by capillary attraction. In this process, the melted brazing material actually diffuses into the interstices between port surface portion 14 and spigot 16, associates with the metal material of the components, and forms alloys with that metal material which have greater strength than the original metal material.

Figure 4:
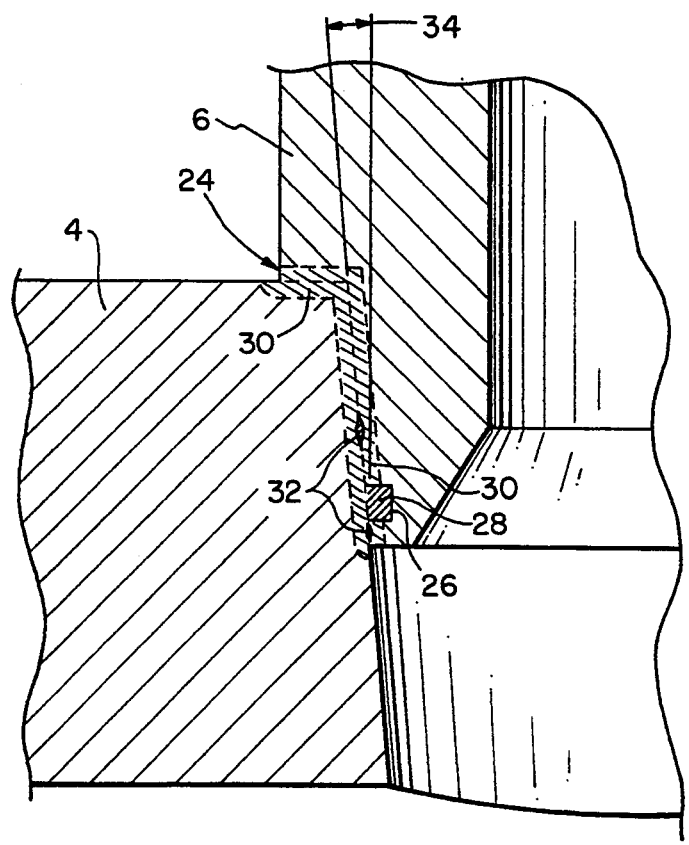
FIG. 4 is an enlarged view, in partial cross-section, of the highlighted portion of FIG. 3 showing the interface between the brazed components.

The enlarged view of interface 24 in FIG. 4 shows that alloyed regions 30 are created after the brazing material melts and diffuses into the material of port 4 and conduit end 6. Although not desired, the imperfections of the mating tapered surfaces also create small pockets 32 of brazing material between the material of port 4 and conduit end 6. Although ideally all of interface 24 would consist of alloyed regions 30, practicalities of manufacturing result in some of the bonding of interface 24 being pure brazing material. However, the tapered structure formed with taper angle 34 greatly facilitates the formation of alloyed regions 30.

Used as a hydraulic coupling, fitting 8 provides improved fluid flow characteristics due to the continuous taper of counterbore 12 to fluid passageway 10. Compared to prior art brazed hydraulic couplings which include a base portion forming a surface perpendicular to flow coming through bore 20, port surface portion 14 has a surface which tapers only slightly from being parallel to the flow through bore 20 and which continuously and uninterruptedly extends to passageway 10. Also, surface 22 of bore 20 tapers outwardly and further promotes more uniform fluid flow by providing a gradual expansion of the cross-sectional fluid flow area. The slight taper of the surfaces exposed to fluid flow, along with the absence of any significant stop or drag in the port-conduit connection, minimizes the turbulence created at bend 36 of the hydraulic coupling provided by fitting 8.

In the preferred embodiment, port body 4 and conduit end 6 are formed conventionally from steel. Brazing material 28 may be any suitable metal or alloy, for example copper. The copper may be in the form of a wire inserted into groove 26 as depicted in FIG. 2, or alternatively a copper paste or other brazing material may be deposited within groove 26. The depth of groove 24 is in the range of about 0.3 mm to 1.0 mm, and preferably about 0.75 mm.

While this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A process for brazing together two components of a fitting for forming a hydraulic coupling, each of the components defining an internal flow chamber and having a surface extending around an opening in communication with the internal flow chamber, each surface mating with the other surface, said process comprising the steps of:
   forming corresponding tapers on each of the mating surfaces;
   forming a groove extending around the opening in one of the mating surfaces;
   locating a brazing material within said groove;
   assembling the mating surfaces in an abutting relation after locating the brazing material within said groove; and
   heating said assembly to melt said brazing material whereby said liquid brazing material penetrates between the abutting mating surfaces.

2. The process of claim 1 wherein the groove formed in said step of forming a groove has a depth in the range of about 0.3 mm to 1.0 mm.

3. The process of claim 1 wherein the components include a bore and a counterbore and the groove formed in said step of forming a groove is located proximate the intersection of the bore and the counterbore.

4. The process of claim 1 wherein said assembling step includes forming an interference fit between the two mating surfaces.

5. The process of claim 1 wherein the tapered mating surfaces created in said forming step are oriented at an angle relative to the axes of the components of less than about 10°.

6. The process of claim 1 wherein the tapered mating surfaces created in said forming step are oriented at an angle relative to the axes of the components of about 5°.

7. The process of claim 1 wherein both components are comprised of steel.

8. A process for brazing together two components of a hydraulic fitting, one of the components having a mating surface adapted to fit inside the other component and contact a corresponding mating surface, said process comprising the steps of:
   forming a taper in each mating surface;
   forming a groove in the mating surface of the one component;
   assembling the mating surfaces in an abutting relation to form an interface therebetween;
   locating a brazing material in the groove of the one component proximate the interface between the tapered mating surfaces; and
   heating said assembly to melt said brazing material whereby said liquid brazing material penetrates the interface between the abutting mating surfaces.

9. The process of claim 8 wherein the tapered mating surfaces created in said forming step are oriented at an angle relative to the axes of the components of less than about 10°.

10. The process of claim 8 wherein the tapered mating surfaces created in said forming step are oriented at an angle relative to the axes of the components of about 5°.

11. The process of claim 8 wherein said assembling step includes forming an interference fit between the two mating surfaces.

12. The process of claim 8 wherein the groove formed in said step of forming a groove has a depth in the range of about 0.3 mm to 1.0 mm.

13. The process of claim 8 wherein the one component includes a bore and the other component includes a counterbore, and the groove formed in said step of forming a groove is located proximate the intersection of the bore and the counterbore.

14. The process of claim 8 wherein both components are comprised of steel.

* * * * *